United States Patent [19]

Schlesinger

[11] 3,816,279

[45] June 11, 1974

[54] PHOTOPOLYMERIZATION OF MIXTURES OF EPOXIDE MATERIALS AND TETRAHYDROFURAN

[75] Inventor: Sheldon I. Schlesinger, Hightstown, N.J.

[73] Assignee: American Can Company, Greenwich, Conn.

[22] Filed: Oct. 19, 1972

[21] Appl. No.: 298,937

Related U.S. Application Data

[63] Continuation-in-part of Ser. No. 753,869, Aug. 20, 1968, Pat. No. 3,708,296.

[52] U.S. Cl.............. 204/159.11, 96/75, 96/91 R, 96/114, 96/115 P, 117/93.31, 117/132 BE, 117/133.8 N, 117/155 R, 204/159.13, 204/159.14, 204/159.18, 204/159.24, 260/2 BP, 260/47 EP, 260/45.7 S, 260/45.8 NZ, 260/45.9 R, 260/88.5, 260/829.83 OR, 260/824 EP, 260/836
[51] Int. Cl. .......................... B01j 1/10, C08d 1/00
[58] Field of Search ...... 96/115 P, 115 R, 75, 91 R; 204/159.11, 159.22, 159.23, 159.14, 159.24; 260/2 BP, 47 EP

[56] References Cited
UNITED STATES PATENTS

| 3,236,784 | 2/1966 | Fischer et al. | 204/159.11 |
| 3,708,296 | 1/1973 | Schlesinger | 96/33 |
| 3,711,390 | 1/1973 | Feinberg | 204/159.11 |
| 3,711,391 | 1/1973 | Feinberg | 204/159.11 |
| 3,721,616 | 3/1973 | Watt | 204/159.11 |
| 3,721,617 | 3/1973 | Watt | 204/159.11 |

*Primary Examiner*—Murray Tillman
*Assistant Examiner*—Richard B. Turer
*Attorney, Agent, or Firm*—Robert P. Auber; Ernestine C. Bartlett; Harries A. Mumma, Jr.

[57] ABSTRACT

Polymerization of polymerizable compositions comprising mixtures of monomeric or prepolymeric epoxides and tetrahydrofuran is effected by mixing such compositions with radiation-sensitive aromatic diazonium salts which decompose upon application of energy such as electromagnetic radiation to release a Lewis acid to initiate polymerization of said monomers.

12 Claims, No Drawings

PHOTOPOLYMERIZATION OF MIXTURES OF EPOXIDE MATERIALS AND TETRAHYDROFURAN

CROSS-REFERENCE TO RELATED APPLICATION

This application is a continuation-in-part of application Ser. No. 753,869, filed Aug. 20, 1968, entitled "Photopolymerization of Epoxy Monomers" now U.S. Pat. No. 3,708,296 issued Jan. 2, 1973.

BACKGROUND OF THE INVENTION

In my co-pending application U.S. Ser. No. 753,869 referred to hereinabove, there are disclosed epoxide-containing materials which are photopolymerizable via use of organic compounds which are radiation-sensitive and release an active catalyst (or initiator) upon exposure to electromagnetic radiation. It has now been discovered that the novel radiation-sensitive catalyst precursors and epoxide materials disclosed and claimed therein may be copolymerized with tetrahydrofuran through the action of such catalyst precursors.

The invention more specifically relates to polymerizable compositions comprising mixtures of monomeric or prepolymeric epoxides with tetrahydrofuran and radiation-sensitive aromatic diazonium salts of complex halogenides and process for polymerization of such compositions.

As discussed in said co-pending application, heretofore polymerization of epoxide materials has been carried out by heating the monomer in which a chemical compound was incorporated until catalysts contained therein were activated, that is, an activation of a catalyst upon heating initiated polymerization of the various monomers. These methods, though successful, are unsatisfactory in that careful attention must be given to staying within the temperature limitations of the system involved. In order to prevent the harmful effects of heat curing, it is often necessary to extend the curing cycle an unreasonable length of time. It is known to photopolymerize tetrahydrofuran employing radiation-sensitive catalysts such as aryldiazonium fluoroborates, perchlorates, and fluoroacetates, for example, as described in U.S. Pat. No. 3,236,784. It is also known to polymerize tetrahydrofuran employing catalysts such as boron trifluoride and heating to effect initiation as in U.S. Pat. No. 2,856,370. This invention is based on the discovery that tetrahydrofuran when admixed with epoxides containing aryldiazonium salts of complex halogenides is coreactive therewith providing flexibility to the resulting polymer and improving the adhesive qualities of the normally less flexible epoxy resins.

Because the mixture is light-curable, it can be employed as a coating or adhesive with substrates which would be distorted or otherwise deformed by heating to effect curing. The compositions of the invention and polymers resulting therefrom are particularly useful in applications where it is desired to employ thick coatings with normally solid epoxy resins such as ECN 1299, an epoxy cresol-novolac resin, as in production of relief-image printing plates. The composition and polymers resulting therefrom are especially suitable for use as encapsulating or potting resins where the desirable electrical resistance, chemical and solvent resistance of normally solid epoxy resins may be retained while eliminating the need to employ undesirable solvents. For example, where protective coatings for printed circuits are desired, unevaporated solvent cannot be tolerated. The instant compositions containing epoxy resins and tetrahydrofuran wherein tetrahydrofuran is a reactive solvent for the epoxy resin resulting in a more flexible copolymer while retaining the desirable properties of the epoxy resin answer a need in the art for such lightcurable, essentially solventless coatings. Tetrahydrofuran is also useful in the present compositions as a reactive diluent or solvent where it is desired to reduce or control the viscosity of an epoxy formulation, be it a liquid or solid epoxide that is used in the formulation.

SUMMARY OF THE INVENTION

This invention then relates to polymerizable materials comprising tetrahydrofuran in admixture with monomeric or prepolymeric epoxides, and a radiation-sensitive catalyst precursor which decomposes upon application of energy to provide a Lewis acid effective to initiate polymerization of said polymerizable materials.

The invention further relates to methods of polymerizing such materials by subjecting the same to the application of energy such as electromagnetic or electron beam irradiation.

DETAILED DESCRIPTION

The monomers defined hereinabove may be tetrahydrofuran and any monomeric or prepolymeric epoxide which is polymerizable to higher molecular weights through the action of a cationic catalyst. While it is recognized that tetrahydrofuran, in a broad sense, is a 1,4-epoxy compound, the term "monomeric and prepolymeric epoxide," as employed herein, is not intended to be inclusive of such compounds. This term is meant to include epoxides other than tetrahydrofuran and preferably, indicates 1,2-epoxides polymerizable to higher molecular weights. In a preferred embodiment normally solid 1,2-epoxide monomers which result in normally solid polymers are admixed with tetrahydrofuran.

Tetrahydrofuran as employed herein is a well-known chemical compound readily available commercially or may be synthesized by methods well-known in the art.

As disclosed herein, compositions of the invention comprise mixtures of tetrahydrofuran with other polymerizable materials such as monomeric and prepolymeric epoxides. Any epoxide material or mixture of such epoxide materials, of suitable viscosity alone or when dissolved in a suitable solvent, polymerizable to higher molecular weights may be utilized. Thus monomeric, prepolymeric or resinous epoxides may be employed in the instant compositions. The classic epoxy resin is obtained by the well known reaction of epichlorohydrin and bis phenol A (4,4'-isopropylidene diphenol). The

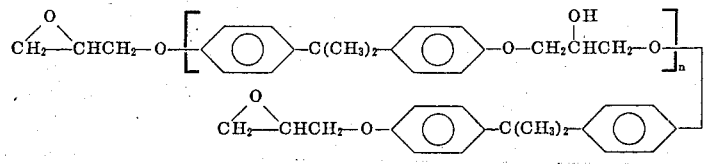

reaction product is believed to have the form of a polyglycidyl ether of bisphenol A, (the glycidyl group being more formally referred to as the 2,3-epoxypropyl group) and thus may be thought of as a polyether derived from the diphenol and glycidol (2,3-epoxy-1-propanol). The structure usually assigned to the resinous product is A viscous liquid epoxy resin, average molecular weight about 380, is obtained by reacting the epichlorohydrin in high molecular proportion relative to the bisphenol A, the reaction product containing well over 85 mole precent of the monomeric diglycidyl ether of bisphenol A ($n=0$), which may be named 2,2-bis[p-(2,3-epoxypropoxy)phenyl]propane, and smaller proportions of polymers in which $n$ is an integer equal to 1, 2, 3, etc. This product exemplifies epoxide monomers and prepolymers, having a moderate molecular weight, preferably of the order of 1,000, or less, which may be cross-linked or otherwise polymerized in accordance with the invention, whereby cleavage of the terminal epoxy or oxirane rings is initiated by the action of the Lewis Acid halide released when energy is applied to the latent polymerization catalyst.

Many other epoxide materials are available in polymerizable monomeric or prepolymeric forms. Among these are 1,2-epoxycyclohexane (cyclohexene oxide, also named 7-oxabicyclo[4.1.0]heptane) and vinylcyclohexene dioxide, more specifically named 3-(epoxyethyl)cyclohexane. Ethylene oxide (oxirane,

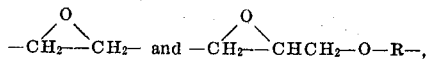

The simplest epoxy ring) and its homologues generally, e.g., propylene oxide (1,2-epoxypropane) and 2,3-epoxybutane, are themselves useful. Other epoxidized cycloalkenes may be used, a readily available polycyclic diepoxide being dicyclopentadiene dioxide, more specifically identified as 3,4-8,9-diepoxytricyclo[5.2.1.0$^{2,6}$] decane.

Glycidyl esters of acrylic acid and of its homologs, methacrylic acid and crotonic acid, are vinyl epoxy monomers of particular interest. Other such monomers are allyl glycidyl ether (1-allyloxy-2,3-epoxypropane) particularly as disclosed and claimed in co-pending U.S. application, Ser. No. 297,829 filed Oct. 16, 1972, and glycidyl phenyl ether (1,2-epoxy-3-phenoxypropane). Another readily available product is a mixture of ethers of the structure

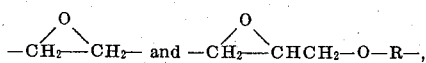

where R is alkyl, that is, glycidyl alkyl ethers. One such mixture contains predominantly glycidyl octyl ether and decyl glycidyl ether; another contains dodecyl glycidyl ether and glycidyl tetradecyl ether. Epoxidized novalac and epoxy cresol novolac prepolymers likewise may be used, as well as polyolefin (e.g., polyethylene) epoxides. The latter are exemplified by epoxidized, low molecular weight by-products of the polymerization of ethylene, which may be separated as mixtures high in 1-alkenes in the range from about 10 to 20 carbon atoms, that is from about 1-decene to about 1-eicosene. Epoxidation then provides mixtures of the corresponding 1,2-epoxyalkanes, examples being mixtures high in the 1,2-epoxy derivatives of alkanes having 11 to 14 carbons, or having 15 to 18 carbons.

Esters of expoxidized cyclic alcohols, or of epoxidized cycloalkanecarboxylic acids, or of both, provide useful epoxide or polyepoxide materials. Thus a suitable ester of epoxidized cyclohexanemethanol and epoxidized cyclohexanecarboxylic acid is the diepoxide (3,4-epoxy-cyclohexyl)methyl 3,4-epoxycyclohexanecarboxylate; this same ester may be indexed under the name 7-oxabicyclo-[4.1.0]hept-3-ylmethyl 7-oxabicyclo[4.1.0]heptane-3-carboxylate. Another suitable diepoxide may be obtained as an ester of a substituted (epoxycycloalkyl)methanol and a dibasic acid, for example, bis[3,4-epoxy-6-methylcyclohexyl)-methyl] adipate, which may be named alternatively bis-[4-methyl-7-oxabicyclo-[4.1.0]hept-3-yl)methyl] adipate. Diepoxide monomeric materials may be obtained conveniently as bis(epoxy alkyl) ethers of glycols, an example being the diglycidyl ether of 1,4-butanediol, that is, 1,4-bis-(2,3-epoxypropoxy)butane. This diepoxide is related to the diglycidyl ether of bisphenol A, shown above as 2,2-bis[p-(2,3-epoxypropoxy)phenyl]-propane.

Other examples of suitable epoxide materials are epoxy alkyl ethers of alkyl silanes such as glycidoxypropyl trimethoxysilane.

The materials utilized as latent polymerization initiators in the process and compositions of the present invention are radiation-sensitive catalyst precursors which decompose to provide a Lewis acid upon application of energy. The energy required for effective decomposition may be energy applied by bombardment with charged particles, notably by high-energy electron beam irradiation. Preferably, however, the catalyst precursors are photosensitive, and the required energy is imparted by actinic irradiation, which is most effective at those regions of the electromagnetic spectrum at which there is high absorption of electromagnetic energy by the particular catalyst precursor used. More than one of these types of energy may be applied to the same system; e.g., ultraviolet light irradiation followed by electron beam irradiation, may be employed, although ultraviolet irradiation ordinarily can effect a suitable cure.

The preferred photosensitive Lewis acid catalyst precursors are aromatic diazonium salts of complex halogenides, which decompose upon application of energy to release a halide Lewis acid. The aromatic diazonium cation may be represented generally as [Ar-N N]$^+$, where the aryl group Ar, which may be an alkaryl hydrocarbon group, is bonded to the diazonium group by replacing one of the hydrogen atoms on a carbon atom of the aromatic nucleus, and where the aryl group ordinarily carries at least one pendant substituent for greater stability of the cation. Thus the pendant substituent may be alkyl, or another substituent, or both. The complex halogenide anion may be represented by [MX$_{n+m}$]$^{-m}$. Thus, the photosensitive salt and its decomposition upon actinic irradiation may be depicted as follows:

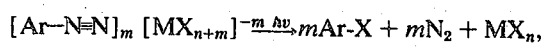

1 where $X$ is the halogen ligand of the complex halogenide, $M$ is the metallic or metalloid central atom thereof, $m$ is the net charge on the complex halogenide ion, and $n$ is the number of halogen atoms in the halide Lewis acid compound released. The Lewis acid halide $MX_n$ is an electron pair acceptor, such as $FeCl_3$, $SnCl_4$, $PF_5$, $AsF_5$, $SbF_5$, and $BiCl_3$, which upon suitable irradiation of the diazonium complex salt is released in substantial quantities and initiates or catalyzes the polymerization process, wherein the monomeric or prepolymeric material is polymerized or cured as the result of the actinic irradiation.

The diazonium compounds of the present invention may be prepared using procedures known in the art, and such preparation forms no part of the present invention. Thus, for example, chlorometallic halogenide complexes may be prepared in accordance with the method set forth by Lee, et al., in *Journal of the American Chemical Society*, 83, 1,928 (1961). Exemplifying a procedure of general utility, aryldiazonium hexafluorophosphates can be prepared by diazotizing the corresponding aniline with $NOPF_6$, made by combining HCl and $NaNO_2$ with subsequent addition of hydrogen hexafluorophosphate ($HPF_6$) or of a hexafluorophosphate salt, or they can be prepared by addition of a hexafluorophosphate salt to another diazonium salt to effect precipitation. As a further example, various morpholinoaryl complexes, containing the group

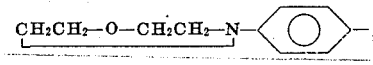

can be prepared either from the aniline derivative or by adding an aqueous solution of a metal salt of the desired complex halogenide to a solution of morpholinobenzenediazonium tetrafluoroborate.

Illustrative of the aromatic diazonium cations comprised in the photosensitive catalyst salts utilized in accordance with the present invention are the following:

p-chlorobenzenediazonium
2,4-dichlorobenzenediazonium
2,5-dichlorobenzenediazonium
2,4,6-trichlorobenzenediazonium
2,4,6-tribromobenzenediazonium
o-nitrobenzenediazonium
p-nitrobenzenediazonium
4-nitro-o-toluenediazonium
  (2-methyl-4-nitrobenzenediazonium)
2-nitro-p-toluenediazonium
  (4-methyl-2-nitrobenzenediazonium)
6-nitro-2,4-xylenediazonium
  (2,4-dimethyl-6-nitrobenzenediazonium)
2-chloro-4-(dimethylamino)-5-methoxybenzenediazonium
4-chloro-2,5-dimethoxybenzenediazonium
2,4′,5-triethoxy-4-biphenyldiazonium
  (2,5-diethoxy-4-(p-ethoxyphenyl)benzenediazonium)
2,5-dimethoxy-4′-methyl-4-biphenyldiazonium
  (2,5-dimethoxy-4-(p-tolyl)benzenediazonium)
2,5-diethoxy-4-(phenylthio)benzenediazonium
2,5-diethoxy-4-(p-tolylthio)benzenediazonium
p-morpholinobenzenediazonium
2,5-dichloro-4-morpholinobenzenediazonium
2,5-dimethoxy-4-morpholinobenzenediazonium
4-(dimethylamino)-naphthalenediazonium Illustrative of the complex halogenide anions comprised in the photosensitive catalyst salts utilized in accordance with the present invention are the following:

tetrachloroferrate(III), $FeCl_4^-$
hexachlorostannate(IV), $SnCl_6^{2-}$
tetrafluoroborate, $BF_4^-$
hexafluorophosphate, $PF_6^-$
hexafluoroarsenate(V), $AsF_6^-$
hexafluoroantimonate(V), $SbF_6^-$
pentachlorobismuthate(III), $BiCl_5^{2-}$ A selection of aromatic diazonium salts of complex halogenides is listed in Table I. Many of the salts listed have been found to be well adapted or superior for use as latent photosensitive polymerization initiators in the process and compositions of the present invention, based on thermal stability, on solubility and stability in the monomer formulations and solvents (if any) used, on photosensitivity, and on ability to effect polymerization with the desired degree of curing after adequate actinic irradiation. Following the name of each aromatic diazonium halogenide is its melting point or decomposition temperature in degrees centigrade, and wavelengths of electromagnetic radiation, in nanometers, at which it exhibits absorption maxima.

TABLE I

| | M.P.,[1] °C. | Abs'n Max., nm. |
|---|---|---|
| 2,4-dichlorobenzenediazonium tetrachloroferrate(III) | 62–64 | 259, 285, 360 |
| p-nitrobenzenediazonium tetrachloroferrate(III) | 93–95 | 243, 257, 310, 360 |
| p-morpholinobenzenediazonium tetrachloroferrate(III) | 121.5 | 240, 267, 313, 364 |
| 2,4-dichlorobenzenediazonium hexachlorostannate(IV) | 190 | 285 |
| p-nitrobenzenediazonium hexachlorostannate(IV) | 126 | 258, 310 |
| 2,4-dichlorobenzenediazonium tetrafluoroborate | 152 | 285, 325–340 (shoulder) |
| p-chlorobenzenediazonium hexafluorophosphate | 162–164 | 273 |
| 2,5-dichlorobenzenediazonium hexafluorophosphate | dec. 140 | 264, 318 |
| 2,4,6-trichlorobenzenediazonium hexafluoropho | 240–250 | 294, 337 |

TABLE I

| | M.P.,[1] °C. | Abs'n Max., nm. |
|---|---|---|
| ,4,6-tribromobenzenediazonium hexafluorophosphate | 245–260 | 306 |
| p-nitrobenzenediazonium hexafluorophosphate | 156(178)[1] | 258, 310 |
| o-nitrobenzenediazonium hexafluorophosphate | 161.5 | |
| 4-nitro-o-toluenediazonium hexafluorophosphate | 123(138) | 262, 319 |
| 2-nitro-p-toluenediazonium hexafluorophosphate | 164–165 | 286 |
| 6-nitro-2,4-xylenediazonium hexafluorophosphate | 150 | 237, 290 |
| p-morpholinobenzenediazonium hexafluorophosphate | 162(181) | 377 |
| 4-chloro-2,5-dimethoxybenzenediazonium hexafluorophosphate | 168–169 (198–208) | 243 (shoulder), 287, 392 |
| 2,5-dimethoxy-4-morpholinobenzenediazonium hexafluorophosphate | Above 135 | 266, 396 |
| 2-chloro-4-(dimethylamino)-5-methoxybenzenediazonium hexafluorophosphate | 111 | 273, 405 |
| 2,5-dimethoxy-4-(p-tolylthio)benzenediazonium hexafluorophosphate | 146(155) | 358, 400 |
| 2,5-diethoxy-4-(p-tolylthio)benzenediazonium hexafluorophosphate | 147(150) | 223 (shoulder), 247, 357, 397 |
| 2,5-dimethoxy-4'-methyl-4-biphenyldiazonium hexafluorophosphate | 167 | 405 |
| 2,4',5-triethoxy-4-biphenyldiazonium hexafluorophosphate | 136 | 265, 415 |
| 4-(dimethylamino)-1-naphthalenediazonium hexafluorophosphate | 148 | 280, 310, 410 |
| p-nitrobenzenediazonium hexafluoroarsenate(V) | 141–144 (161) | 257, 310 |
| p-morpholinobenzenediazonium hexafluoroarsenate(V) | 162 (176–177) | 257, 378 |
| 2,5-dichlorobenzenediazonium hexafluoroantimonate(V) | 161–162.5 | 238, 358 |
| p-nitrobenzenediazonium hexafluoroantimonate(V) | 140–141 | 257, 308 |
| p-morpholinobenzenediazonium hexafluoroantimonate(V) | 153 (177.5–180.5) | 254, 374 |
| 2,4-dichlorobenzenediazonium hexachloroantimonate(V) | 178–180 | 279, 322 (shoulder) |
| p-nitrobenzenediazonium fluoroborate | 140(148–50) | 258, 311 |
| 2,5-diethoxy-4-(p-tolylthio) benzenediazonium fluoroborate | 150(157) | 354, 403 |
| p-N-morpholino benzenediazonium fluoroborate | 155(163) | 257, 375 |
| 2,4-dichlorobenzenediazonium pentachlorobismuthate(III) | 193.5–195 | 285, 313 |
| o-nitrobenzenediazonium pentachlorobismuthate(III) | 166.5–168 | 285, 313 |

Note 1 - The melting points given in Table I were determined generally by the usual visual capillary tube method; in most cases discoloration began below the observed melting point temperature with frothing decomposition at that temperature. In some cases melting points or exotherms were determined also by differential thermal analysis under nitrogen gas, and the temperatures so determined are given in parentheses. The wavelengths of absorption maxima in the ultraviolet-to-visible range were determined with the diazonium complex salt dissolved in acetonitrile.

In accordance with the present invention, the procedures for admixing the radiation-sensitive compounds with the polymerizable materials are relatively simple and can be carried out in the following manner:

The polymerizable material (tetrahydrofuran, epoxy monomer or mixtures thereof) is combined with a radiation-sensitive aryldiazonium compound of the invention. Suitable inert solvents may be employed if desired in effecting this mixture. By a suitable inert solvent is meant one that does not react appreciably with the polymerizable material or the aryl-diazonium compound before exposure to actinic radiation. Examples of such solvents include dimethyl ether of diethylene glycol, anisole, acetonitrile, butyronitrile, toluene, acetone, xylene, methyl ethyl ketone, ethyl ether, cellosolve ether, 1,1,2,2-tetra chloroethane monochloro benzene, tetrachloroethane, O-chlorotoluene, O-dichlorobenzene, trichloroethylene, propylene carbonate, etc. Mixtures of these solvents may be employed particularly if mixtures of epoxides are employed. It is to be understood, however, that the use of solvents is not mandatory in carrying out the present invention and it is a distinct feature of the invention that tetrahydrofuran is employed as a reactive solvent for the epoxy monomer or mixture of such monomers. When a solvent is employed, the exact amount of solvent necessary will depend upon the particular polymerizable material and diazonium compound employed, most of which are soluble in any event in the tetrahydrofuran of the invention. Where such monomers are not soluble in tetrahydrofuran, the solvent is used in sufficient quantity to dissolve both the aryl-diazonium compound and any insoluble polymerizable component.

The mixtures of epoxy monomer and tetrahydrofuran employed herein may vary considerably as desired. In general, compositions comprising from 10 to 90 per cent by weight tetrahydrofuran and, correspondingly 10 to 90 per cent by weight epoxy monomer may be utilized. Preferably, 1 to 1 mixtures are employed.

The amount of photosensitive compound employed in the admixture need not be specifically ascertained but is related to the amount of monomer being polymerized. It has been found that quite satisfactory results are obtained by providing a diazonium complex salt in amount by weight of from about 0.5 percent to about 5 percent of the catalyst precursor relative to the weight of the polymerizable material provided, about 1 percent or less being amply effective with some of the monomercatalyst precursor systems.

Referring to equation 1 hereinabove showing the photolytic decomposition of the catalyst precursor, the halide Lewis acid $MX_n$ released reacts with the monomers of the invention with a result exemplified by the following:

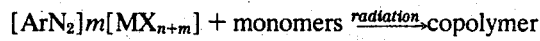

$$[ArN_2]m[MX_{n+m}] + \text{monomers} \xrightarrow{radiation} \text{copolymer}$$

2

The cationic catalyst is believed to act by cleaving a carbon-oxygen bond, initiating growth of a polymeric chain or permitting formation of a cross-linkage. A general application of the process embodied by equations 1 and 2 can be as follows: a diazonium complex salt, for example, as identified hereinabove, is admixed with or without the use of a suitable solvent, with a monomer. The mixture is thereafter coated on a suitable substrate such as a metal plate, plastic, or paper, and the substrate is exposed to ultraviolet or electron beam radiation. On exposure the diazonium compound decomposes to yield the Lewis acid catalyst, which initiates the polymerization of the monomer.

The source of radiation for carrying out the method of the present invention can be any suitable source, such as the ultraviolet actinic radiation produced from a mercury, xenon, or carbon arc, or the electron beam produced by a cathode ray gun. The only limitation placed on the radiation source used is that it must have an energy level at the irradiated film sufficient to impart to the polymerizable system energy at an intensity high enough to reach the decomposition level of the photosensitive compounds. As previously noted, the wavelength (frequency) range of actinic radiation is chosen to obtain sufficient absorption of energy to excite the desired decomposition.

For an imaging system, the mixture of tetrahydrofuran and epoxy monomer, which may contain a suitable solvent in substantial proportions if desired, is coated on a metal plate, dried if necessary to remove solvent present, and the plate is exposed to ultraviolet light through a mask or negative. The light initiates polymerization which propagates rapidly in the exposed image areas. The resulting polymer in the exposed areas is resistant to many or most solvents and chemicals, while the unexposed areas can be washed with suitable solvents to leave a reversal image of a polymer in this embodiment.

The polymers produced by the polymerization process of the present invention are useful in a wide variety of applications in the fields of graphic arts and coatings due to their superior adhesion to many kinds of surfaces, excellent resistance to most solvents and chemicals, and capability of forming high resolution images. Among such uses are photoresists for chemical milling, gravure images, offset plates, stencil-making, micro-images for printed circuitry, thermoset vesicular images, micro-images for information storage, decoration of paper, glass, and packages, and light-cured coatings. As discussed hereinabove, polymers produced by this invention are especially useful in those applications where a flexible coating is desired, for example, an encapsulating or potting resins for electrical wiring, or printed circuits where heat curing for any reason would not be feasible.

It may be desirable to include in the composition an inert pigment or filler, which may be present in even a major proportion by weight, or small amounts of inert nonvolatile liquids such as mineral oil. Inclusion of such inert ingredients usually makes advisable a proportionate increase in the optimum amount of catalyst precursor used. Nevertheless, the precursors needed rarely exceeds 5 percent of the entire weight of the composition.

It may further be desirable to include stabilizers or gelation inhibitors for said mixtures of monomers and catalyst particularly when such admixture includes epoxides. Suitable compounds for such purpose may be sulfoxides such as methyl sulfoxide, propyl sulfoxide, the 1-oxide of tetrahydrothiophene, etc. as disclosed in U.S. application Ser. No. 144,665 filed May 18, 1971 now U.S. Pat. No. 3,711,391 issued Jan. 16, 1973; organic amides and ureas such as N,N-dimethylacetamide and 1,1,3,3-tetramethylurea as disclosed in U.S. application Ser. No. 144,666 filed May 18, 1971 now U.S. Pat. No. 3,711,390 issued Jan. 16, 1973; cyclic amides such as 1-methyl-2-pyrrolidinone, poly(1-vinyl-2-pyrrolidinone), etc. as disclosed in U.S. application Ser. No. 144,642 and organic nitriles such as acetonitrile as disclosed in U.S. application Ser. No. 144,667 filed May 18, 1971 now U.S. Pat. Nos. 3,721,617 and 3,721,616, respectively, both issued March 20, 1973. When employed, as disclosed in said copending applications the inhibitors are utilized in amounts which may vary from about 0.005 to 1 percent of the weight of the polymerizable material present in the composition, an amount of inhibitor of less than about 1 percent by weight of polymerizable material being nearly always sufficient.

The following examples will serve to further illustrate the present invention.

Example 1

A 1 to 1 mixture was prepared by dissolving 24.3 g. of ECN 1299 (an epoxy cresol-novolac having a molecular weight of about 1270) and 24.3 g. of tetrahydrofuran. To the resultant mixture was added 0.744 g. of 2,5-diethoxy-4-(p-tolylthio)benzene diazonium hexafluorophosphate. The following tests were run employing this formulation:

a. 3.35 g. of the formulation was placed in an aluminum dish and exposed to a 360W Uviarc mercury arc at 22cm for 45 seconds. The sample weight immediately after exposure was determined to be 3.13 g. A dry skin formed on the liquid surface immediately after exposure. The entire exposed sample had cured to a pliable, solid disk within 20 hours in the dark following the exposure. The final weight was determined to be 2.93 g., indicating a weight loss of 0.42 g., or 25 percent of tetrahydrofuran. The resulting clear yellow polymer was thus determined to be composed of 4 parts ECN 1299 to 3 parts tetrahydrofuran.

b. The disk of polymer thus prepared could be bent up to a 45° angle without breakage, it resisted fingernail scratching and was insoluble in methyl ethyl ketone.

Example 2

A mixture was made to contain 16.52 g. of tetrahydrofuran, 8.26 g. of a glycidyl methacrylate-allyl glycidyl ether copolymer and 0.600 g. of 2,5-diethoxy-4-(p-tolylthio)-benzene diazonium hexafluorophosphate. The viscous mixture was used to make draw-down coatings on paperboard an on nylon film. After each coating was made, it was immediately exposed to a 360W Uviarc lamp at 22cm distance. The coating on the paperboard after 10 seconds exposure became insoluble in acetone. When a portion of the coated surface of another paperboard sample was covered to exclude the UV light during a 5 second exposure period, and then washed with methyl ethyl ketone, only the unexposed coating washed away.

After coating the nylon film sample, a second uncoated sheet of nylon film was pressed against the wet coating, and the laminate was exposed for 10 seconds to the same lamp as above. The two films had a tendency to stick together immediately. After 24 hours, the two films had a stronger tendency to adhere and offered resistance when peeled apart.

Example 3

The following formulation was prepared:

3.49 g. tetrahydrofuran, 2.07 g. Araldite 6084 (a bisphenol A-glycidyl ether) 20 g. RD—2 (1,4-butanediol diglycidyl ether) 20 g. CY 179 (cycloaliphatic epoxide) 0.136 g. 2,5-diethoxy-4-(p-tolylthio)benzene diazonium hexafluorophosphate and 0.40 g. p-chlorobenzene diazonium hexafluorophosphate. The above components were mixed to form a clear yellow solution. A draw-down coating was made on paperboard, and another on grained aluminum using a No. 6 wire-wound Meyer rod. When exposed to a 360W mercury arc at 22cm distance for 10 seconds, each coating formed a glossy hard coating that could not be marred by fingerprints 15 seconds after the exposure.

A sheet of nylon film was coated as described above. A second sheet was pressed on top of the coated surface. After 15 seconds of exposure to the same mercury light source, some adhesive tendency was noted. When pulled apart after 24 hours, a resistance to peeling was noted indicating adhesion between the two films.

It is thought that the invention and many of its attendant advantages will be understood from the foregoing description and it will be apparent that various changes may be made in the matter of the ingredients, their identity, and their proportions and in the steps of the process and their order of accomplishment without departing from the spirit and scope of the invention or sacrificing all of its material advantages, the form hereinabove described being merely a preferred embodiment thereof.

I claim:

1. A polymerizable composition comprising: tetrahydrofuran in admixture with a monomeric or prepolymeric 1,2-epoxide material polymerizable to higher molecular weights through the action of a cationic catalyst and a radiation-sensitive aromatic diazonium salt of a complex halogenide which decomposes upon irradiation to provide a Lewis acid effective to initiate polymerization of said polymerizable material, said radiation-sensitive salt having had substantially no exposure to a radiation source.

2. The composition of claim 1 wherein said epoxide material is a mixture of epoxides.

3. The composition of claim 2 wherein said complex halogenide is 2,5-diethoxy-4-(p-tolylthio)benzene diazonium hexafluorophosphate.

4. The process of polymerizing a mixture of tetrahydrofuran and a monomeric or prepolymeric epoxide material polymerizable to higher molecular weights through the action of a cationic catalyst which comprises:

forming the mixture of tetrahydrofuran, a monomeric or prepolymeric 1,2-epoxide material and a radiation-sensitive aromatic diazonium salt of a complex halogenide which decomposes upon irradiation to provide a Lewis acid effective to initiate polymerization of said mixture, and subsequently exposing the resulting mixture to a radiation source to release said Lewis acid in sufficient amounts to effect polymerization of said mixture.

5. The process of claim 4 wherein said monomeric or prepolymeric epoxide material is a mixture of epoxides.

6. The process of claim 5 wherein said complex halogenide is a hexafluorophosphate.

7. The process of claim 6 wherein said complex halogenide is 2,5-diethoxy-4-(p-tolylthio)benzene diazonium hexafluorophosphate.

8. The process of claim 7 wherein said radiation is electromagnetic radiation.

9. The composition of claim 1 wherein said epoxide material is an epoxy cresol novolac.

10. The composition of claim 1 wherein said epoxide material is a glycidyl methacrylate-allyl glycidyl ether copolymer.

11. The composition of claim 1 wherein said epoxide material is a glycidyl ether of bisphenol A.

12. The composition of claim 3 wherein said epoxide material is a mixture of a glycidyl ether of bisphenol A, 1,4-butanediol diglycidyl ether and a cycloaliphatic epoxide.

* * * * *